Patented Oct. 7, 1941

2,258,168

UNITED STATES PATENT OFFICE 2,258,168

GLUCOSIDE ETHER FROM POLYSACCHARIDE ETHERS

Elwood V. White, Moscow, Idaho, assignor to The Dow Chemical Company, Midland, Mich., a corporation of Michigan No Drawing. Application September 13, 1939, Serial No. 294,678

11 Claims. (Cl. 260—210)

This invention relates to the preparation of new and useful glucose derivatives.

It is an object of this invention to prepare compounds from the alkyl or aralkyl ethers of cellulose or starch which will have utility as plasticizers for cellulose derivative compositions, as humectants, and as intermediates in the preparation of valuable ether-esters.

Another object is the preparation of new glucosides having ether groupings attached to the glucose residue in one or more of the 2, 3, and 6 positions.

Further objects will become apparent from the following.

These objects are attained by the treatment of an etherified starch or cellulose in the presence of a catalyst with an hydroxy compound of an aliphatic character, either a primary or secondary monohydric alcoholic body containing 3 or more carbon atoms or any polyhydric alcohol. Suitable hydroxy bodies are butyl alcohol, glycol, glycerol, mono-ethyl glycol, mono-ethyl glycerol, phenoxy ethanol, cyclo-hexanol, and the like. This list may be extended indefinitely. It includes all primary and secondary monohydric alcohols of more than two carbon atoms, and all polyhydric alcohols. The heating of a cellulose or starch ether with 3 to 6 times its weight of an alcohol of the type aforesaid in the presence of a catalytic quantity of a mineral acid or acid salt leads to the production of glucosides of a defined constitution, i. e. glucosides variously substituted in the 2, 3 and 6 positions. A consideration of the well established structure of cellulose makes this apparent. Cellulose is believed to consist of beta-glucose anhydride residues linked in the manner shown.

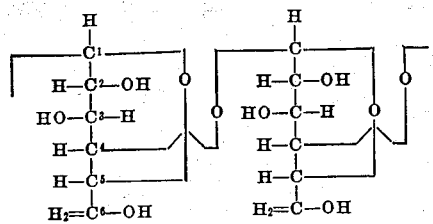

From this constitution it is seen that the only positions available for substitution during etherification are the 2, 3 and 6 positions. The new glucosides, prepared from cellulose ethers according to the present invention by a process of alcoholysis, have the structural formula

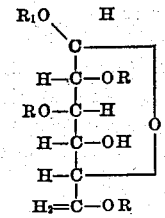

wherein $R_1$ is a glycosidic group derived from the alcohol used, and at least one R represents the alkyl or aralkyl groups present in the cellulose ether used as raw material, the remainder of the radicals R being hydrogen. The alcohols $R_1OH$ which may be employed in the preparation of the new compounds are primary or secondary alcohols which provide radicals $R_1$ which may be defined as alkyl, aralkyl, alkoxy-alkyl, aryloxy-alkyl and cycloalkyl radicals of more than 2 carbon atoms, and hydroxy-alkyl or polyhydroxy-alkyl radicals.

A consideration of the known configuration of starch units leads to the conclusion that the alcoholysis of starch ethers will give glucosides of the same definition as those obtained from cellulose ethers. Both differ from glucosidic mixtures obtained by etherification and alcoholysis of glucose as the latter contain substituents in the 4 position.

In the practice of this invention, the raw material used may be purified cellulose or starch obtained from any source by any of the methods known to the art. It is converted to alkali cellulose or alkali starch and subjected to reaction with an alkylating or aralkylating agent in the usual manner. Alternatively, one of the commercially available cellulose ethers may be taken in place of carrying out the etherification of the polysaccharide. The purified and substantially dry cellulose ether is heated with 3 to 6 times its weight of an anhydrous alcohol of the class described containing 0.5–3 per cent of acid catalyst at atmospheric or superatmospheric pressure. The temperatures of heating should not be sufficient to cause any substantial charring of the reaction mixture; temperatures of 100°–130° C. are normally suitable. The product of this treatment will ordinarily consist of a mixture of alkyl or aralkyl glucosides. When highly substituted cellulose or starch ethers are used as starting materials, the product will consist predominantly of 2.3.6-tri-substituted glucosides, the balance being mixed di-substituted glucosides. Similarly, suitable lowly substituted polysaccharide ethers will give mostly mono- and di-substituted glucosides. The process is therefore capable of yielding a wide range of products having a correspondingly wide range of properties and utility.

The following table illustrates a few of the glucosides of the invention:

| Starting materials | | Glucosidic substituent | Product | |
|---|---|---|---|---|
| Cellulose ether | Alcohol | | Ether substituent | |
| | | | Number, kind | |
| Benzyl cellulose | Butanol | Butyl | Mono- and di-benzyl. | |
| Ethyl cellulose | Cyclohexanol | Cyclohexyl | Di- and tri-ethyl. | |
| Do | Beta-phenyl ethanol | Beta-phenyl ethyl | Do. | |
| Do | Lauryl alcohol | Lauryl | Do. | |
| Propyl cellulose | Butanol | Butyl | Mono- and di-propyl. | |
| Benzyl cellulose | Cyclohexanol | Cyclohexyl | Mono- and di-cyclohexyl. | |
| Ethyl cellulose | Fenchyl alcohol | Fenchyl | Di- and tri-ethyl. | |

Other products are named in the following examples which illustrate the practice of the present invention. Neither the above table nor the appended illustrations of practice should be taken as limiting the scope of the invention.

EXAMPLE 1

*Preparation of glucosides from ethyl cellulose and glycerine*

100 grams of ethyl cellulose, containing 49.0 per cent ethoxyl, is placed in a 600 c. c. glass reaction tube and 250 c. c. of glycerine is added containing 4 per cent of dissolved dry sulphuric acid. A further 250 c. c. of pure glycerine is then added and the reaction vessel sealed. After heating for 6 hours at 125° C., the vessel is cooled, opened, and the residual acid in the reaction product neutralized by addition of barium carbonate to the liquor at 100° C. The resulting mixture is filtered and distilled under reduced pressure. Residual glycerol is removed at 100° C. and 1.5 mm. pressure, after which the temperature rises rapidly to 250° C. The glycerine glucoside distills at 250°–290° C. at this pressure, as a colorless oil which rapidly absorbs distillation vapors. The viscous final product is of a light color and contains 44.1 per cent ethoxyl. It is useful as a humectant, as an intermediate in the preparation of sorbitol ethers and ether-esters, and as a cellulose derivative plasticizer.

EXAMPLE 2

*Preparation of beta-hydroxy-ethyl mixed di- and tri-ethyl glucosides from ethyl cellulose*

This preparation is carried out as described in Example 1, ethylene glycol replacing glycerine, and the heating under pressure being continued for 4 hours at 120°–130° C. The product is recovered as before, distills at 180°–210° C. at 1.5 mm., and is a water white liquid having moderate hygroscopicity, useful in the preparation of ester products.

EXAMPLE 3

*Preparation of mixed di- and tri-ethyl glucosides of beta-(para-tertiary-butyl phenoxy)-ethanol*

100 grams of ethyl cellulose of 49.0 per cent ethoxyl is placed in a 600 c. c. glass reaction tube containing 500 c. c. of beta-(para-tertiary-butyl phenoxy) ethanol and 2 per cent of dissolved hydrochloric acid. The tube is sealed and heated for 3 hours at 125° C. A dark colored tarry liquid is obtained which is neutralized with barium carbonate, filtered and taken up in a large quantity of petroleum ether to separate most of the tarry material which is insoluble in aliphatic hydrocarbons. The petroleum ether is removed by evaporation and the residue distilled under reduced pressure to remove excess alcohol. The still residue is again taken up in petroleum ether, filtered with filtercel to remove final traces of tar, and evaporated. The syrupy residue distills at 250°–270° C. under 2 mm. pressure giving a light colored product with the following characteristics:

Refractive index _____ 1.4970
Density _____ 1.066 (35°/4° C.)
Ethoxyl content _____ 30.1 per cent

EXAMPLE 4

*The preparation of butyl diethyl glucoside*

Mixed butyl ethyl glucosides were prepared by the alcoholysis of ethyl cellulose with normal butyl alcohol and hydrogen chloride in a manner similar to that described in each of the foregoing examples. There was obtained from 3856 grams of ethyl cellulose a yield of 3874 grams of mixed butyl ethyl glucosides as a light oily product which was separated into its major constituents by fractional distillation. The butyl diethyl glucoside fraction boiled at 160°–165° C. at 2 mm. pressure and had a refractive index of 1.4585 at 20° C. Other fractions obtained had refractive indexes in the range from 1.4510 to 1.4605 and the ethoxyl content of the various fractions ranged progressively downward from 53.5 to 43 per cent as the boiling point increased.

EXAMPLE 5

*Preparation of butyl butyl glucosides*

In a manner similar to that set forth in the foregoing example, butyl cellulose was subjected to alcoholysis with a butyl alcohol solution of hydrogen chloride. The reaction mixture was subsequently neutralized and decolorized in the usual manner and evaporated in vacuo to a light oily liquid. The principal product distills at 180°—210° C. at 2 mm. pressure, most of the fraction coming over at 200°–210° C. This fraction of the butyl butyl glucoside has a butoxyl value of 49.3 per cent and a refractive index of 1.4522 at 20° C.

I claim:

1. A compound having the general formula

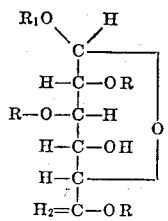

wherein at least one R is selected from the class consisting of alkyl and aralkyl radicals, the other radicals R being hydrogen, and $R_1$ representing a primary or secondary alcohol radical selected from the group consisting of the alkyl, aralkyl, alkoxy-alkyl, aryloxy-alkyl and cycloalkyl radicals containing more than two carbon atoms, and the hydroxy-alkyl and polyhydroxy-alkyl radicals from polyhydric alcohols containing from 2 to 3 hydroxyl groups.

2. A product comprising a mixture of compounds having the general formula of claim 1.

3. A compound having the formula set forth in claim 1, wherein at least one radical R is a benzyl group.

4. A beta-(para-tertiary-butyl phenoxy)-ethyl ethyl glucoside.

5. A method which comprises heating a compound selected from the group consisting of (a) mono-hydroxy compounds containing primary or secondary alcohol groupings and of more than 2 carbon atoms, and (b) polyhydric alcohols containing from 2 to 3 hydroxyl groups, with an ether of a polyhexose in the presence of a catalytic amount of a mineral acid, all reactants being substantially anhydrous, at a temperature of alcoholysis above about 100° C. but which is insufficient to cause any substantial charring of the reaction mixture, continuing the heating to effect alcoholysis of the polyhexose ether with the formation of glucoside ethers substituted in at least one of the 2, 3 and 6 positions and unsubstituted in the 4 position, and separating said glucoside ethers from the reaction mixture.

6. A method which comprises heating an ether of a polyhexose with from 3 to 6 times its weight of a compound selected from the group consisting of (a) mono-hydroxy compounds containing primary or secondary alcohol groupings and of more than 2 carbon atoms, and (b) polyhydric alcohols containing from 2 to 3 hydroxyl groups, in the presence of a catalytic amount of a mineral acid, all reactants being substantially anhydrous, at a temperature of alcoholysis above about 100° C. but which is insufficient to cause any substantial charring of the reaction mixture, continuing the heating to effect alcoholysis of the polyhexose ether with the formation of glucoside ethers substituted in at least one of the 2, 3 and 6 positions and unsubstituted in the 4 position, and separating said glucoside ethers from the reaction mixture.

7. A method which comprises heating an ether of a polyhexose with from 3 to 6 times its weight of a compound selected from the group consisting of (a) mono-hydroxy compounds containing primary or secondary alcohol groupings and of more than 2 carbon atoms, and (b) polyhydric alcohols containing from 2 to 3 hydroxyl groups in the presence of an amount of dry hydrochloric acid approximately equal to 2 per cent of the weight of the mixed substantially anhydrous reactants, at a temperature of alcoholysis above about 100° C. but which is insufficient to cause any substantial charring of the reaction mixture, continuing the heating to effect alcoholysis of the polyhexose ether with the formation of glucoside ethers substituted in at least one of the 2, 3 and 6 positions and unsubstituted in the 4 position, and separating said glucoside ethers from the reaction mixture.

8. A method which comprises heating at 100° to 130° C. an ether of a polyhexose with from 3 to 6 times its weight of a compound selected from the group consisting of (a) mono-hydroxy compounds containing primary or secondary alcohol groupings and of more than 2 carbon atoms, and (b) polyhydric alcohols containing from 2 to 3 hydroxyl groups, in the presence of a catalytic amount of a mineral acid, all reactants being substantially anhydrous, continuing the heating to ecect alcoholysis of the polyhexose ether with the formation of glucoside ethers substituted in at least one of the 2, 3 and 6 positions and unsubstituted in the 4 position, and separating said glucoside ethers from the reaction mixture.

9. A method as claimed in claim 8, wherein the polyhexose ether is an alkyl ether of cellulose.

10. A method as claimed in claim 8, wherein the polyhexose ether is an aralkyl ether of cellulose.

11. A glyceryl ethyl glucoside having the formula

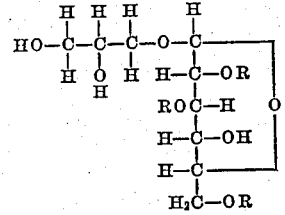

wherein at least one radical R is an ethyl group, the other radicals R being hydrogen.

ELWOOD V. WHITE.